Oct. 1, 1946.       B. F. KING       2,408,652
CENTER DRILL CHUCK
Filed July 11, 1944

INVENTOR
BENJAMIN F. KING.
BY
ATTORNEY

Patented Oct. 1, 1946

2,408,652

UNITED STATES PATENT OFFICE 2,408,652

CENTER DRILL CHUCK

Benjamin F. King, Endicott, N. Y., assignor to International Business Machines Corporation, New York, N. Y., a corporation of New York Application July 11, 1944, Serial No. 544,400

3 Claims. (Cl. 77—66)

This invention relates generally to means for controlling drilling and more specifically for limiting the extent of center drilling.

It is common practice to drill a pair of depressions in the ends of pieces of work to be turned on a lathe. These center drill openings are cut by a special drill having a pointed end with sloping sides. The sloping sides of the depressions provide bearing areas for supporting the work on centers projecting from the head and tail stock of the lathe. The size of the sloping areas is determined by the extent to which the center drill is projected into the work.

Heretofore, center drilling was an operation without control for determining the amount that the drill was fed into the work. Of course, if the center drill is not projected sufficiently, there is left only a small supporting sloping area to carry the work on the lathe centers. Then, again, if the center drill is projected too far into the work, there is left a sharp shoulder projection which tends to damage the centers of the lathe. The ideal condition is one in which the center drill is projected into the work for the full extent of the sloping area, but no further. It is such control that is achieved by the structural features of the present invention.

An object of the invention is the provision of stopping controls for limiting the extent of drilling operations.

Another object of the invention is to provide a freely rotating stop associated with a drill chuck for limiting the depth of cut of a drill and for avoiding damage to the work by turning freely with the work when the stop abuts against it.

Another object of the invention is the provision of a ball bearing stop collar connected to a shoulder on a chuck for a center drill. The surface of the rotating collar is relieved with grooves for carrying off the chips. By permitting a full cutting stroke of the center drill, there is provided the maximum sloping center depression area for the finished work. Furthermore, the center openings are of a standard depth and size making it easier for the lathe operator to mount such work for subsequent operation.

Other objects of the invention will be pointed out in the following description and claims and illustrated in the accompanying drawing, which discloses, by way of example, the principle of the invention and the best mode, which has been contemplated, of applying that principle.

Figure 1:
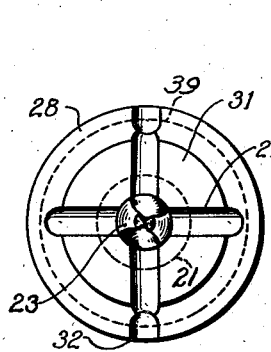
Fig. 1 is an end view showing the contact area of the stop collar.
Figure 2:
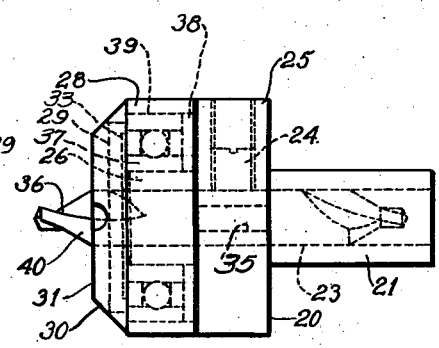
Fig. 2 is a side elevation view of the complete device.
Figure 4:
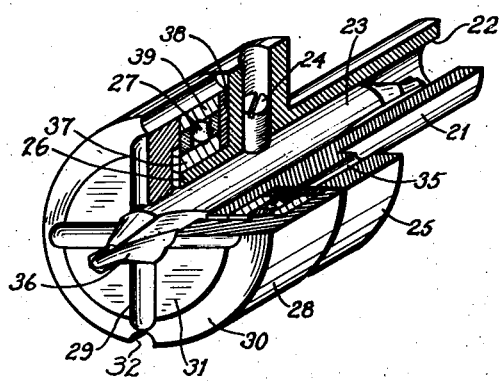
Fig. 4 is a sectional isometric view of the entire device.

In Fig. 2 it is seen that a tool holder or drill chuck 20 is formed with a reduced end 21 for mounting it in the tail stock of a lathe or the chuck of any revolving machine tool. The center of the chuck 20 is cut out with a cylindrical opening 22 (Fig. 4) for receiving a drill bit in the form of a center drill 23. Of course, other drill or reamer forms can also be used to advantage for other hole cutting jobs. The position of the bit in the chuck is maintained by a set screw 24 threaded in a flange or shoulder 25 formed on chuck 20. Also formed on chuck 20 is an end portion 26 over which is forced an inner race ring 37 carrying a circular ball bearing 27 which is of a combined thrust and radial guide type for supporting the freely rotating stop collar 28. This collar 28 is cup-shaped and is secured to the outer race ring 39 of the ball bearing. Formed in the outer abutting end of collar 28 is a series of radial grooves 29 provided to allow the escape of chips curving back from the cutting edges 36 of the drill. Formed on the inside of collar 28 is a depression or recess 33 (Fig. 2) which provides clearance so that the rotatable collar is free from contact with the left side of the fixed inner race 37 and the end portion 26 of chuck 20.

Figure 3:
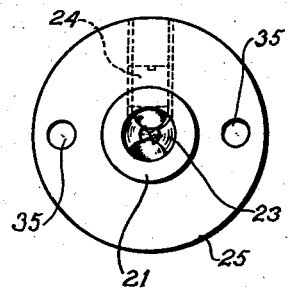
Fig. 3 is an end view of the chuck securing end.

Collar 28 is formed with a conical end and the sides are cut to slope at 30 and form a reduced stopping surface 31 directly surrounding the projecting end of the drill. In order to aid in fastening the collar to the ball bearing and to remove it therefrom, the collar is formed with a pair of side expansion grooves or slots 32. Other means for effecting the mounting of the bearing are provided in connection with the formation of the shoulder or flange 25 on the chuck. Adjacent the shoulder is placed a washer 38 which fits over end portion 26 and abuts against the inside of the ball bearing races 37 and 39. Reference to Fig. 3 shows that a pair of openings 35 is cut through the shoulder 25 so that the bearing and collar may be pushed off the chuck by a rod projected through an opening 35 and struck against washer 38.

The device is made effective by placing the drill bit in the chuck opening 22 and inserting the bit so that the sloping side 40 of the drill extends as far as possible beyond the surface 31 of the stop collar without having the sharp corner of the sloping edge project beyond the collar.

Of course, there are other times when shorter or longer sloping surfaces are desired, and the bit can then be inserted as desired before the set screw 24 is tightened.

In operation, the chuck is mounted in the tail stock of a lathe and advanced to project the drill into the end of the work until the surface 31 of the collar contacts the end of the work. It then rotates along with the work and prevents scoring or scratching of the part which would otherwise occur with a fixed stop collar.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cutting device for a work rotating machine, a tool holder, a shoulder on said tool holder, a reduced end portion on said tool holder, a circular ball bearing forced on said end portion, a stop collar on said bearing to turn with respect to said holder, and a washer between said shoulder and said bearing, said shoulder being formed with openings through which said washer may be struck to push the bearing and collar off said tool holder.

2. In a device for center drilling, a center drill bit, a chuck for holding said bit, means for adjustably securing said bit in said chuck, an end portion on said chuck, a circular ball bearing mounted on said end portion, a stop collar mounted on the bearing and freely rotative with respect to said drill bit which projects therethrough, a flange on said chuck next to said end portion, a washer on said end portion and between said flange and said bearing, said flange being formed with openings through which said washer may be struck to push the bearing off said end portion.

3. In a device for controlling drilling in a work rotating machine, a chuck for holding a drill bit, said chuck having a cylindrical end portion and a cylindrical flange with an opening therethrough for the bit, a set screw in the flange for adjustably securing said bit in the chuck, a combined circular thrust and radial load ball bearing attached with a force fit on said end portion, a washer between said bearing and said flange, said flange being formed with openings through which said washer may be struck to push the bearing off said end portion, a cup-shaped stop collar the sides of which are cut with expansion slots to provide a force fit for assembling the collar over said ball bearing, said collar having a centralized drill bit opening in a reduced flattened conical end pointed towards the cutting end of said drill bit, said conical end also being formed with radial chip clearance grooves, whereby the stop collar limits the depth of cut and abuts against the rotating work to revolve therewith.

BENJAMIN F. KING.